US009788242B2

(12) United States Patent
Nuggehalli et al.

(10) Patent No.: US 9,788,242 B2
(45) Date of Patent: Oct. 10, 2017

(54) NETWORK SELECTION AND DATA AGGREGATION WITH LTE-WLAN AGGREGATION

(71) Applicant: MEDIATEK INC., Hsinchu (TW)

(72) Inventors: Pavan Santhana Krishna Nuggehalli, Mountain View, CA (US); Chia-Chun Hsu, New Taipei (TW); Chie-Ming Chou, Taichung (TW)

(73) Assignee: MEDIATEK INC., HsinChu (TW)

( * ) Notice: Subject to any disclaimer, the term of this patent is extended or adjusted under 35 U.S.C. 154(b) by 58 days.

(21) Appl. No.: 15/015,382

(22) Filed: Feb. 4, 2016

(65) Prior Publication Data

US 2016/0234726 A1    Aug. 11, 2016

Related U.S. Application Data

(60) Provisional application No. 62/112,193, filed on Feb. 5, 2015.

(51) Int. Cl.
*H04W 4/00* (2009.01)
*H04W 36/00* (2009.01)
(Continued)

(52) U.S. Cl.
CPC ... *H04W 36/0022* (2013.01); *H04W 36/0061* (2013.01); *H04W 36/0072* (2013.01);
(Continued)

(58) Field of Classification Search
CPC .......... H04L 2012/5608; H04W 84/12; H04W 88/08; H04W 80/04; H04W 8/26; H04W 88/06; H04W 84/18
(Continued)

(56) References Cited

U.S. PATENT DOCUMENTS 9,265,055 B2 *   2/2016   Okuda ................ H04W 72/085
2014/0133294 A1 *   5/2014   Horn .................. H04W 28/0247
                                                                                                        370/230
(Continued)

FOREIGN PATENT DOCUMENTS

WO   WO2014074705 A1   5/2014
WO   WO2014182613 A1   11/2014
(Continued)

OTHER PUBLICATIONS

International Search Report and Written Opinion of International Search Authority for PCT/CN2016/073582 dated May 11, 2016 (13 pages).

*Primary Examiner* — Brenda H Pham
(74) *Attorney, Agent, or Firm* — Imperium Patent Works; Helen Mao

(57) ABSTRACT

Apparatus and methods are provided for selection and data aggregation for the LWA. In one novel aspect, the UE connected with a first RAN receives a LWA assistance configuration and selects a second RAN based on the LWA assistance configuration. The UE aggregates data traffic from the first RAN and the selected second RAN. In one embodiment, the information request-and-response procedure is used, which allows the first RAN to query the UE about its second RAN association status. In another embodiment, the selection request-and-response procedure is used, which allows the first RAN to exercise some control over which base station of the second RAN is selected by the UE and for the UE to send relevant information about its second RAN connectivity to the first RAN. In another novel aspect, the UE selects a DRB based on the LWA DRB configuration through either a NAS procedure or an operator configuration.

20 Claims, 6 Drawing Sheets

(51) Int. Cl.
*H04W 36/14* (2009.01)
*H04W 48/08* (2009.01)
*H04W 84/12* (2009.01)
*H04W 88/06* (2009.01)

(52) U.S. Cl.
CPC ....... *H04W 36/0094* (2013.01); *H04W 36/14* (2013.01); *H04W 48/08* (2013.01); *H04W 84/12* (2013.01); *H04W 88/06* (2013.01)

(58) Field of Classification Search
USPC ............. 370/310.2, 349, 328, 338, 331, 332
See application file for complete search history.

(56) References Cited

U.S. PATENT DOCUMENTS

| | | | |
|---|---|---|---|
| 2014/0293970 A1* | 10/2014 | Damnjanovic | H04L 5/0078 370/336 |
| 2014/0328318 A1 | 11/2014 | Sundararajan et al. | 370/331 |
| 2014/0329526 A1 | 11/2014 | Sundararajan et al. | 455/436 |
| 2014/0369329 A1* | 12/2014 | Lee | H04W 28/06 370/338 |
| 2015/0124743 A1* | 5/2015 | Damnjanovic | H04W 76/025 370/329 |
| 2015/0334724 A1 | 11/2015 | Faccin et al. | 370/235 |
| 2016/0043844 A1* | 2/2016 | Meylan | H04L 5/0048 370/315 |
| 2016/0174107 A1* | 6/2016 | Kanugovi | H04L 12/28 370/236 |

FOREIGN PATENT DOCUMENTS

| | | |
|---|---|---|
| WO | WO2014182714 A1 | 11/2014 |
| WO | WO2015175148 A1 | 11/2015 |

\* cited by examiner

NETWORK SELECTION AND DATA AGGREGATION WITH LTE-WLAN AGGREGATION

CROSS REFERENCE TO RELATED APPLICATIONS

This application claims priority under 35 U.S.C. §119 from U.S. Provisional Application No. 62/112,193 entitled "Network Selection and Data Aggregation with LTE-WLAN Aggregation" filed on Feb. 5, 2015, the subject matter of which is incorporated herein by reference.

TECHNICAL FIELD

The disclosed embodiments relate generally to wireless communication, and, more particularly, to network selection and data aggregation with LTE-WLAN aggregation.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Internetworking between the LTE network and the unlicensed spectrum WLAN provides additional bandwidth to the operators. The LTE-WLAN aggregation (LWA) provides data aggregation at the radio access network where an eNB schedules packets to be served on LTE and WiFi radio link. The advantage of this solution is that it can provide better control and utilization of resources on both links. This can increase the aggregate throughput for all users and improve the total system capacity by better managing the radio resources among users. However, issues remain as to how to implement efficiently the LWA. The first problem is the WLAN selection issue. There may be many APs deployed in an area. Some of the APs may not be known to the eNB. Some of the APs may not support the LWA feature. The second problem is the dedicated radio bearer (DRB) selection. For example, some applications may not be desirable for the LWA. How to select a suitable a suitable DRB is another issue needs to be solved.

Improvements and enhancements are required for selection and data aggregation for the LWA.

SUMMARY

Apparatus and methods are provided for selection and data aggregation for the LWA. In one novel aspect, the UE connected with a first RAN receives a LWA assistance configuration and selects a second RAN based on the LWA assistance configuration. The UE aggregates data traffic at least between the first RAN and the second RAN. In one embodiment, the second RAN is WLAN, and the LWA assistance configuration at least one information element comprising: a list of LWA-enabled WLAN APs, a list of LWA-enabled WLAN APs with the type of LWA access supported, a list of prioritized LWA-enabled WLAN APs, and one or more threshold values for selecting a WLAN AP. In another embodiment, The UE receives a measurement report configuration from the connected first RAN and sends the measurement report based on the measurement report configuration. The measurement report configuration includes at least one element comprising: a list of WLAN APs to scan, a list of WLAN frequencies to scan, and a measurement-report triggering scheme. In yet another embodiment, the second RAN selection further uses the second RAN information request-and-response procedure, which allows the first RAN to query the UE about its second RAN association status, and for the UE to report its second RAN connectivity status to the first RAN. In one embodiment, the second RAN selection further uses the selection request-and-response procedure that allows first RAN to exercise some control over which second RAN is selected by the UE and for the UE to send relevant information about its second RAN connectivity to the first RAN.

In another novel aspect, the UE selects a DRB based on the LWA DRB configuration. In one embodiment, the network entity, such as an MME, exercises control over which DRBs are selected for LWA and controls how a set of related DRBs are treated. In one embodiment, selecting DRBs for LWA access is managed by NAS layer signaling. In one embodiment, the LWA DRB configuration indicates an allowability of all evolved packet system (EPS) bearers, and wherein the UE receives the LWA DRB configuration through a NAS EPS mobility management (EMM) procedure using at least one of NAS messages comprising an ATTACH ACCEPT message, and a TAU ACCEPT message. In another embodiment, the LWA DRB configuration indicates a LWA eligibility of one or more specific EPS bearers, and wherein the UE receives the LWA DRB configuration through a NAS session management (ESM) procedure. In yet another embodiment, the LWA DRB configuration is obtained based on an IP flow configuration configured by at least one settings comprising: an operator configuration through open mobile alliance (OMA) device management (DM) procedures, and a pre-configuration on the UE.

In one novel aspect, LWA applies to data aggregation between different radio access technologies (RAT). The UE can aggregation data traffic from multiple radio access links using different radio access network (RAN). In this specification, the LTE technology is used throughout as an exemplary first RAN. Similarly, the WLAN technology is used as an exemplary second RAN. It is understood by one of ordinary skills in the art that other RAN can be used in place of the LTE as the first RAN and WLAN as the second RAN.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

LWA is a tight integration at radio level, which allows for real-time channel and load aware radio resource management across WLAN and LTE to provide significant capacity and QoE improvements. When enabling LWA, Sl-U is terminated at eNB whereby all IP packets are routing to eNB and perform PDCP aspects (i.e., ROHC, ciphering) as an LTE PDU. Afterwards, eNB can schedule whether LWA-LTE link or LWA-Wi-Fi link the LTE PDU shall go. In this invention, we disclose how a LTE PDU being routing over eNB-AP and AP-Wi-Fi modem. To this end, adaption layer with (de-) encapsulation mechanism located at eNB and Wi-Fi modem is introduced to provide such innovation without changing WLAN AP behavior significantly. LWA borrows the concept of existing dual connectivity to let WLAN network being transport to CN for reducing CN load and support "Packet level" offload. It is understood by one of ordinary skills in the art that the principle of the methods may apply other data aggregation scenarios. Though LTE and WLAN are being used in the description, the disclosed method applies to other RAN as well.

Figure 1:
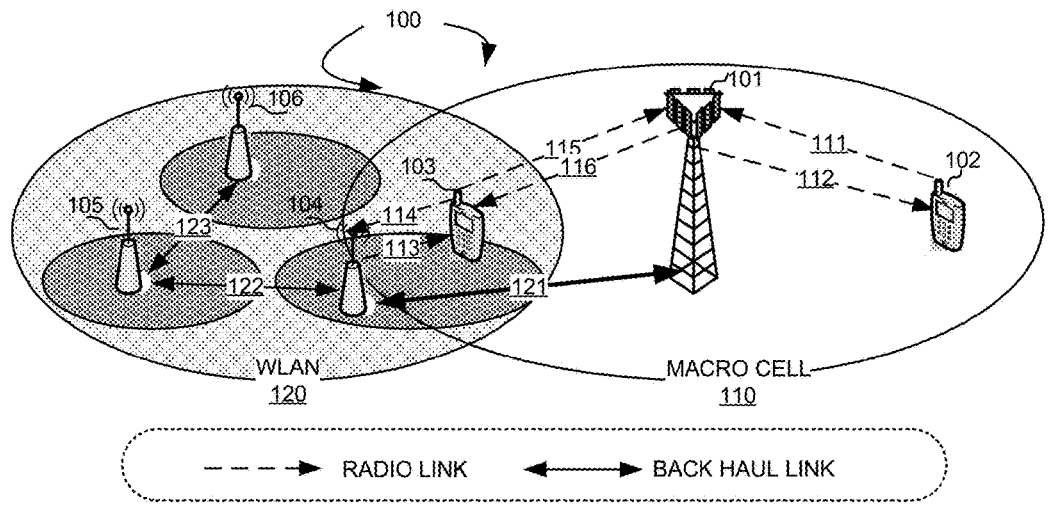
FIG. 1 illustrates a system diagram of a wireless network with LWA in accordance with embodiments of the current invention.
Figure 1:
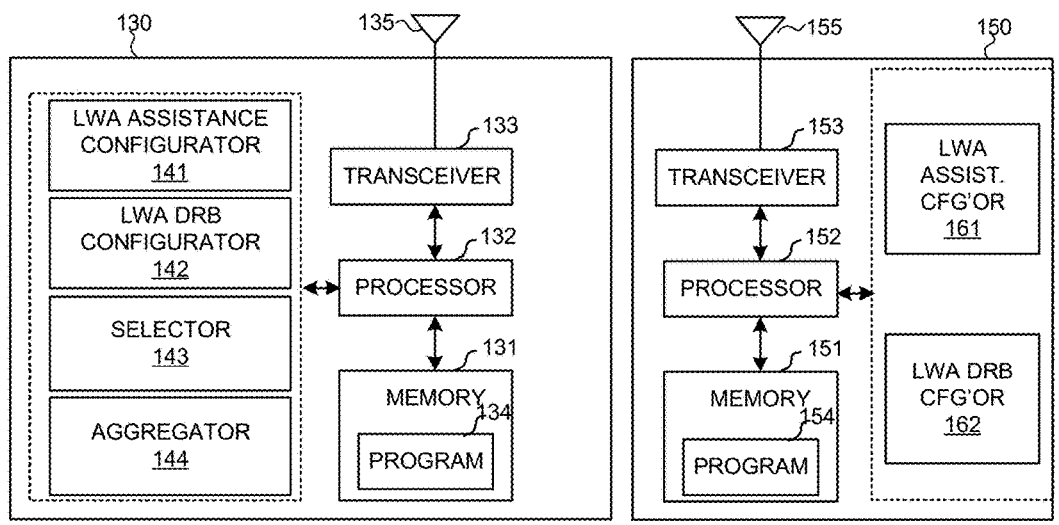

FIG. 1 illustrates a system diagram of a wireless network 100 with the LWA in accordance with embodiments of the current invention. Wireless network 100 comprises a main base station eNB, also referred as a macro eNB 101, UEs with dual connectivity 102, 103, and small cell eNBs 104, 105 and 106. Wireless network 100 supports multiple component carriers over different frequency channels, dual connectivity, and carrier aggregation for serving cells originated from different eNBs. A UE 102 is served by eNB 101 with an uplink 111 and down link 112. UE 102 is served by Macro Cell 110 only because eNB 101 is the only base station in range. UE 103, however, is in the range with eNB 101 and eNB 104. When UE 103 is configured with dual connectivity, UE 103 is served by eNB 101 with uplink 115 and downlink 116. At the same time, UE 103 is also served by eNB 104 with uplink 113 and downlink 114. Wireless system 100 is configured with a Macro Cell 110, which includes the macro eNB 101 and WLAN 120, which includes WLAN APs 104, 105 and 106. Wireless network 100 can be an inter-RAT CA network, with the anchor eNB 101 employs one technology, for example LTE or other cellular standards, while base stations 104, 105 and 106 using different wireless standards, such as Wifi. Regardless of the inter-BS CA using the same standard or different standard, UE 103 is configured to be LWA-enabled and can perform data aggregation between its anchor eNB 101 and WLAN AP 104, which is in the range of UE 103.

In one exemplary configuration, initially, UE 103 camps on the macro cell served by eNB 101. UE 101 establishes Radio Resource Control (RRC) connection with the Radio Access Network (RAN). eNB 101 provides and controls the initial RRC connection and provides NAS mobility information and security input. eNB 101 is the anchor eNB for UE 103. UE 101 subsequently moves within the coverage area of anchor eNB 101 while moving into the coverage area of WLAN 120. Upon entering WLAN 120's coverage area, UE 101 can select a WLAN AP to aggregate its data traffic if needed. In such situation, LTE-WLAN aggregation can be configured for UE 101. UE 101 can use additional resources from WLAN AP 103.

In one exemplary configuration, backhaul connection 121 connects macro cell eNB 101 with WLAN AP 104 through Xn interface, for example, Xw or X2 interface. The coordination between anchor eNB 101 and WLAN AP 104 can be performed through Xn interface, for example, Xw or X2 interface. The Xn interfaces, also known as backhaul connections provide communication and coordination between eNBs and WLAN APs. Similarly, backhaul connection 122 within the WLAN 120 connects WLAN APs 104 and 105 through Xn interface.

FIG. 1 further illustrates simplified block diagrams 130 and 150 for UE 103 and eNB 101, respectively. Mobile station 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103.

Mobile station 103 also includes multiple function modules that carry out different tasks in accordance with embodiments of the current invention. A LWA assistance configurator 141 configures a LWA assistance configuration. A LWA DRB configurator 142 obtains a LWA DRB configuration. A selector 143 selects a WLAN access point (AP) based on the LWA assistance configuration. An aggregator 144 aggregates data traffic at least among the macro-cell eNB and the selected WLAN AP.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101.

eNB 101 also includes multiple function modules that carry out different tasks in accordance with embodiments of the current invention. A LWA assistance configurator 161 handles LWA configuration functions and communicates with the UE. A LWA DRB configurator 162 handles LWA DRB configuration functions and communicates with the UE.

Figure 2:
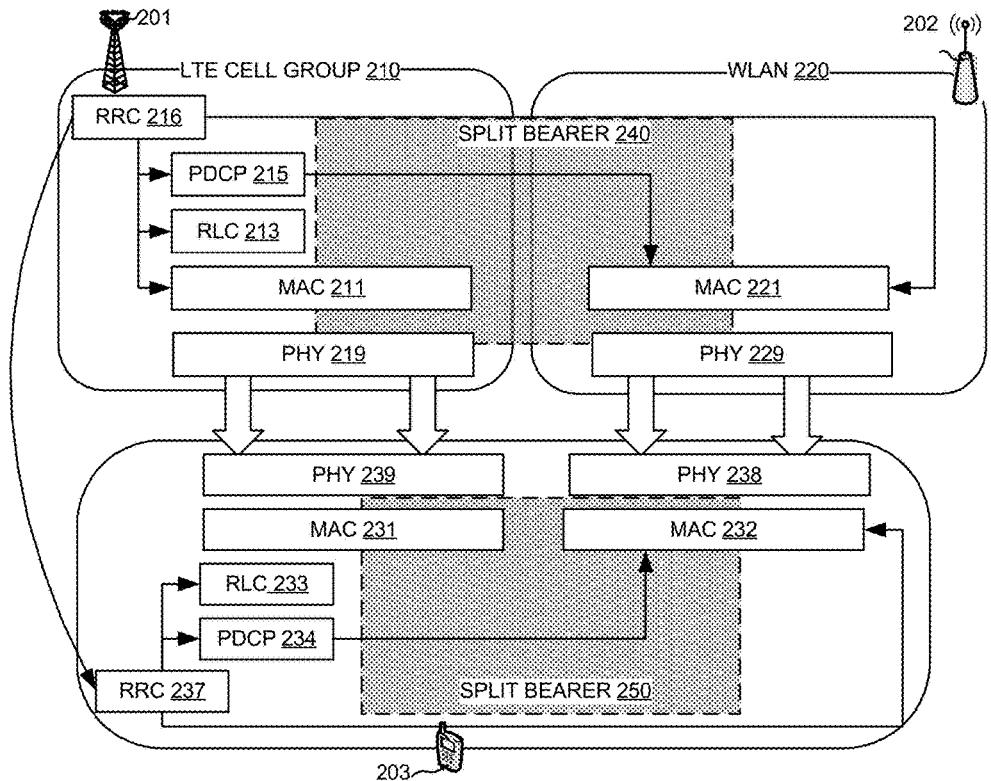
FIG. 2 shows an exemplary diagram of LWA enabled network entities in accordance with embodiments of the current invention.

FIG. 2 shows an exemplary diagram of LWA enabled network entities in accordance with embodiments of the current invention. A UE 203 LWA-enabled is configured with LWA information connecting with an eNB 201 and a WLAN AP 202. eNB 201 is configured with a LTE cell group 210. WLAN AP 202 is configured with a WLAN cell group 220. eNB 201 has a PHY 219 and a MAC entity 211. A RLC 213 communicates with MAC 211 and further communicates with a PDCP layer 215. PDCP 215, RLC 213, and MAC 211 forms LTE bearer protocol stack that carries data communication for LTE bearers only. Similarly, WLAN 202 has a PHY 229 and MAC entity 221. MAC 221 forms WLAN bearer protocol stack that carries data communication for SCG bearers only. A split bearer 240 is formed with protocol stacks served from both eNB 201 and WLAN 202. At the radio resource control (RRC) layer, only one RRC 216 in eNB 201 is configured. RRC 216 controls the protocol stacks in both eNB 201 and WLAN 202 by communicating with a corresponding RRC layer entity in UE 203.

UE 203 with LWA-enabled has two MAC entities, MAC entity 231 and MAC entity 232; and two PHY entities, PHY 239 and PHY 238. An RLC 233 communicates with MAC 231 and further communicates with a PDCP layer 234. PDCP 234, RLC 233 and MAC 231 forms UE bearer protocol stack that carries data communication for LTE and WLAN bearers. A split bearer 250 is formed for split bearers from both eNB 201 and WLAN 202. At the RRC layer, only one RRC 237 is configured. RRC 237 controls the protocol stacks in corresponding to MAC entities 231 and 232 by communicating with RRC 216 in eNB 201.

Figure 3:
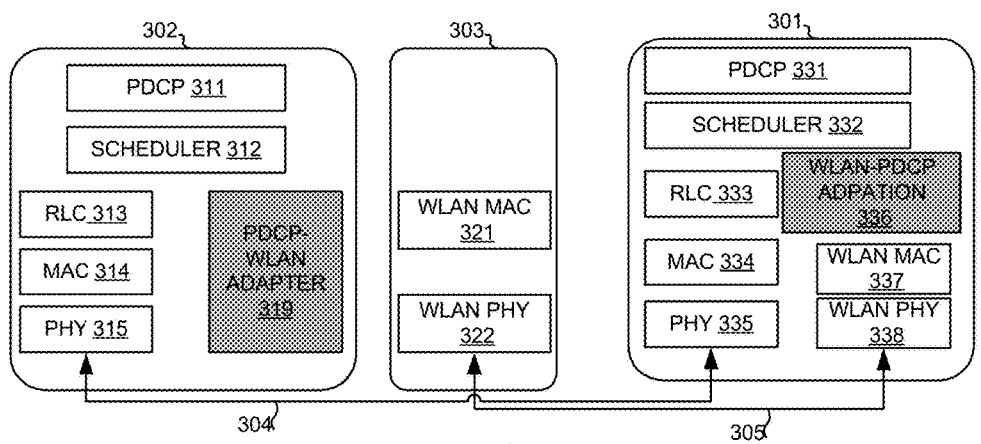
FIG. 3 shows exemplary block diagrams of a UE with LWA-enabled connecting with an eNB and a WLAN AP with data aggregation at radio link level in accordance with embodiments of the current invention.

FIG. 3 shows exemplary block diagrams of a UE with LWA-enabled connecting with an eNB and a WLAN AP with data aggregation at radio link level in accordance with embodiments of the current invention. A UE 301 is connected with an eNB 302. UE 301 also selects a WLAN AP 303 for data aggregation. eNB 302 has a PHY layer 315, a MAC layer 314, a RLC layer 313, a scheduler layer 312 and a PDCP layer 311. To enable the LWA, eNB 302 also has a PDCP-WLAN adapter 319 that aggregates the LTE data traffic through PHY 315 with WLAN data traffic through WLAN AP 303. WLAN AP 303 has a WLAN PHY 322 and a WLAN MAC layer 321. WLAN AP 303 connects with WLAN network and can offload data traffic from the LTE network when the UE with LWA enabled is connected with both the LTE eNB and the WLAN AP.

UE 301 is LWA-enabled. UE 301 has a PHY 335, a MAC 334, and a RLC layer 333 that connect with the LTE eNB 302. UE 301 also has a WLAN PHY layer 338 and a WLAN MAC layer 337 that connect with WLAN AP 303. A WLAN-PDCP adaption layer 336 handles the split carrier from the LTE and the WLAN. UE 301 also has a scheduler 332 and PDCP 331. In novel aspect, the WLAN AP is selected based on a LWA assistance configuration. UE 301 aggregation its data traffic with eNB 302 and WLAN AP 303. WLAN PHY 322 of WLAN AP 303 connects with WLAN PHY 338 of UE 301 through WLAN interface. PHY 315 of LTE eNB 302 connects with PHY 335 of UE 301 through uu interface. Both the LTE data traffic and the WLAN data traffic is aggregated at the PDCP layer of UE 301.

Figure 4:
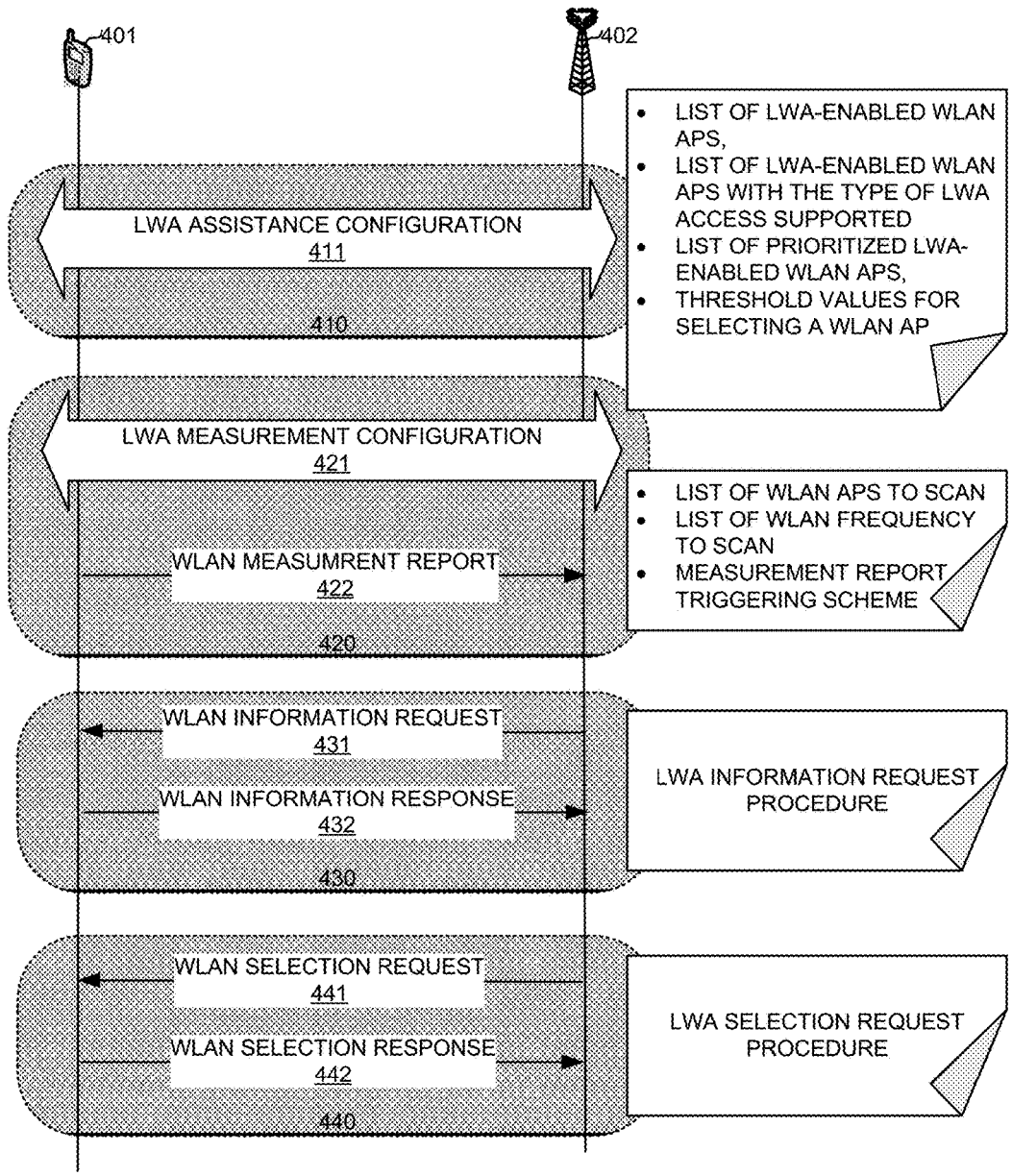
FIG. 4 illustrates an exemplary diagram of a WLAN AP selection procedure based on a LWA assistance configuration by the UE in accordance with embodiments of the current invention.

FIG. 4 illustrates an exemplary diagram of a WLAN AP selection procedure based on a LWA assistance configuration by the UE in accordance with embodiments of the current invention. In one novel aspect, the UE selects a WLAN AP for LWA purpose based on a LWA assistance configuration. A LWA-enabled UE 401 connects with an eNB 402. In the first embodiment, at stage 410, the UE obtains LWA assistance configuration from the LTE. In the second embodiment, at stage 420, the LTE eNB configures UE measurement report to enable the UE to select an appropriate WLAN for LWA purposes. In the third embodiment, at stage 430, the WLAN information request-and-response procedure allows the eNB to query the UE about its WLAN association status, and for the UE to report its WLAN connectivity status to the eNB. In the fourth embodiment, at stage 440, the selection request-and-response procedure allows the eNB to exercise some control over which AP is selected by the UE and for the UE to send relevant information about its WLAN connectivity to the eNB.

In one embodiment, the UE obtains LWA assistance configuration at step 411. The eNB may send assistance information to the UE. The assistance information may be specific to a particular WLAN or apply to all WLANs providing LWA access. The assistance information may be broadcast as system information and/or be transferred over dedicated RRC signaling. The LWA assistance configuration may include of one or more of the following information elements: 1) A list of WLAN APs identified by the SSID, BESSID, or HESSID that provides LWA access, 2) the type of LWA access that is supported. For example, only downlink or only uplink LWA access is supported. In another example, splitting of data over LTE and WLAN access may or may not be permitted for downlink and/or uplink traffic, 3) The priority value per WLAN. Considerations for assigning priority values to WLANs can include: backhaul capability (e.g., downlink and uplink backhaul rates), networking status (e.g. eNB and AP belong to the same or different LAN domains), WLAN AP load, version of 802.11 supported, and support of various IEEE and WFA features (e.g., RTS/CTS support and HS2.0), 4) Threshold values for WLAN channel utilization, backhaul rates, Beacon RSSI, LTE RSRP and LTE RSRQ as identified in 3GPP TS 36.304, Section 5.6.2. In one embodiment, the UE may be preconfigured by rules that utilize the thresholds sent by the eNB to determine if a particular WLAN can be selected for LWA purposes. For example, a WLAN AP can be selected for LWA purposes if the WLAN Beacon RSSI is above a certain threshold and the WLAN channel utilization is less than a certain threshold. These rules can be specified in several ways such as predefine in the RRC specification, the ANDSF policy, and/or through proprietary configuration.

In another embodiment, the UE obtains LWA measurement configuration from the eNB at step 421. At step 422, UE 401 replies with a WLAN measurement report based on the measurement configuration. The UE may be directed to perform measurements both for the serving AP (if any) as well as other APs that the UE detects. The WLAN measurement objects can include Beacon RSSI, RSNI, and RCPI for example. The eNB may specify a list of WLAN APs and/or WLAN frequency channels for the UE to scan, or require the UE to scan all available WLAN APs and/or WLAN frequency channels. The eNB can also control how the UE reports the result of its measurements to the eNB. In one embodiment, the reporting may be triggered by specific events. For example, the reporting may be triggered when the measured quantity exceeds a certain threshold. Measurement reporting may also be configured to be periodic, or a response to a single-shot report on demand from the eNB. In one embodiment, a prohibit-timer like mechanism may be used to limit uplink overhead incurred in sending measurement reports from the UE to the eNB. Event triggered mechanisms may also be dependent on the UE's speed. For example, the UE may not trigger WLAN measurement reporting when the UE's speed is estimated to be higher than a certain threshold, even if the Beacon RSSI is sufficiently good. Alternatively, the eNB may selectively initiate the WLAN discovery procedure based on UE's speed.

In yet another embodiment, WLAN information request-response procedure is used. At step 431, eNB 402 sends a WLAN information request message to UE 401 to request UE's connectivity status. At step 432, UE 401 responds with a WLAN information response message. The UE's information response may contain one or more of the following elements including: 1) WLAN association status when connected, 2) the identity of associated WLAN AP (SSID, BSSID, and/or HESSID), 3) the UE's IEEE MAC address, 4) UE's IP address (if connected and the UE receives an IP address for the WLAN network interface). The IP address could refer to an IPv4 address, IPv6 address, or include both an IPv4 and an IPv6 address, and 5) Summary WLAN statistics. These statistics could include measured data rates in uplink and downlink direction, time of association, WLAN channel utilization, WLAN backhaul rates. These summary statistics can also be reported separately or primary and secondary channels (e.g., in the case of 802.11ac) or be reported in a combined fashion.

In one embodiment, the UE will not divulge its connectivity status to the eNB. For example, the UE may be connected to a private WLAN, or the UE may be connected to an AP that does not provide LWA access for the UE's registered PLMN. For such situations, the UE may provide one or more cause codes in the information response sent to the eNB indicating that it is not prepared to support LWA access.

In one embodiment, network selection request-response procedure is used. At step 441, eNB 402 sends a WLAN selection request message to UE 401. At step 442, UE 401 responds with a WLAN selection response message. The eNB may request the UE to associate with a particular WLAN AP or one of a set of WLAN APs for LWA access. It may also optionally provide a timer value to indicate the time allowed for the UE to associate with the desired WLAN AP. In one embodiment, the eNB may inform the UE that it does not intend to enable LWA access. The eNB may optionally indicate a duration of time for which it will not enable LWA access. The UE can use this information in conjunction with other policies to inform its network selection decision. In another embodiment, the UE may attempt to select the WLAN AP(s) indicated by the eNB in the network selection request. The UE may then send the result of its selection attempt to the eNB, including one or more of the following elements: 1) Status of the WLAN association attempt (i.e. success or failure), and 2) In case of failure to associate with the indicated WLAN AP(s), the UE may provide some diagnostic information. Such information can include WLAN radio conditions as well as reason codes provided by the AP while exchanging messages related to authentication and association procedures. In yet another embodiment, the UE may decide that it cannot comply with the request from the eNB for any reason. For example, selecting the AP(s) indicated by the eNB may violate user preference or some other policy being implemented by the UE's connection manager. In such situations, the UE may indicate its inability to honor the request from the eNB in the network-selection request message.

After a WLAN AP is selected for the LWA, a DRB needs to be selected. In one novel aspect, a DRB is selected based a LWA DRB configuration. It is desirable for the network to exercise control over which DRBs are selected for LWA and to control how a set of related DRBs are treated (i.e. either all the members of the set are selected for LWA or none of them are). In one embodiment, selecting DRBs for LWA access is managed by NAS layer signaling since only the CN has the requisite information (e.g., nature of application and subscriber profile).

Figure 5:
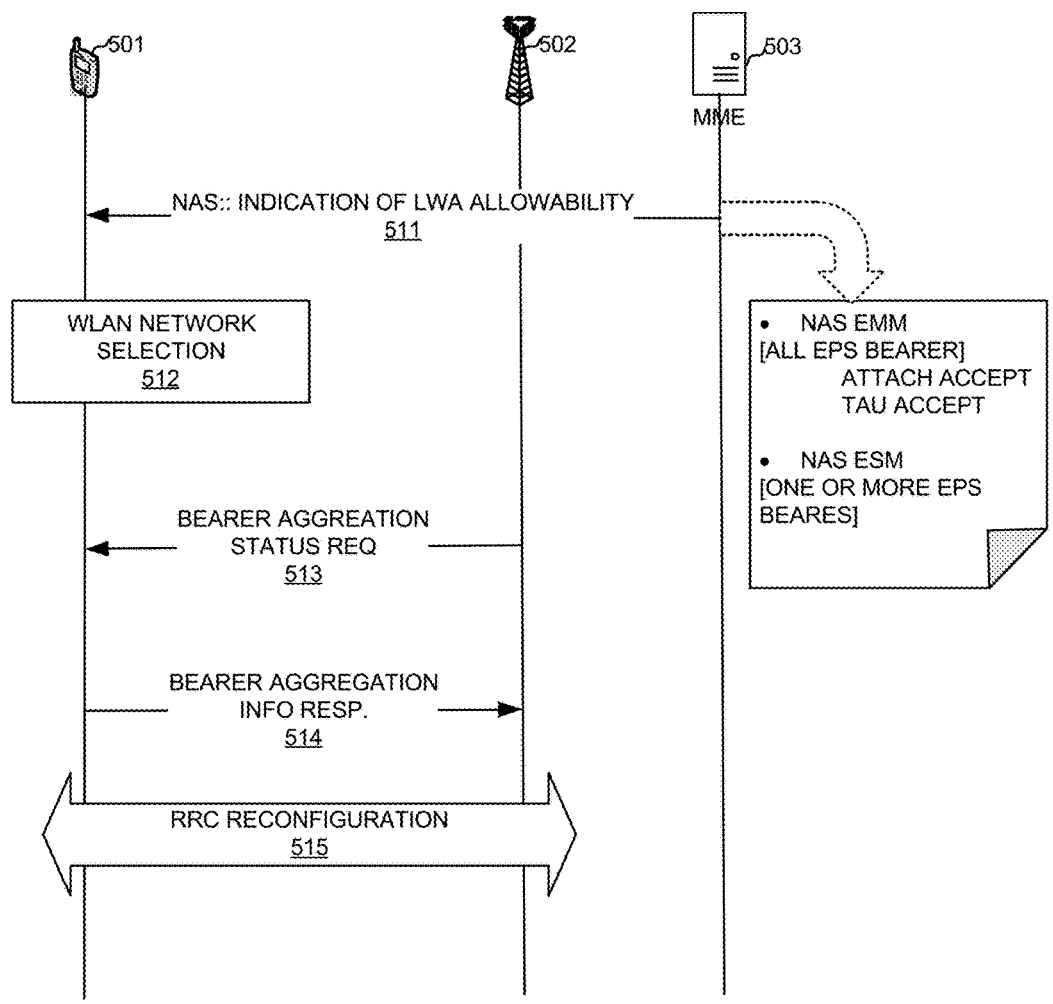
FIG. 5 illustrates an exemplary diagram of a DRB selection procedure for the LWA based on a LWA DRB configuration by the UE in accordance with embodiments of the current invention.

FIG. 5 illustrates an exemplary diagram of a DRB selection procedure for the LWA based on a LWA DRB configuration of the UE in accordance with embodiments of the current invention. A UE 501 is connected with an eNB 502 and a network entity, such as an MME 503. At step 511, MME 503 sends an indication of LWA allowability message to UE 501 through the NAS layer. At step 512, UE 501 selects a WLAN AP for data aggregation. At step 513, eNB 502 sends a bearer-aggregation status request message to UE 501. At step 514, UE 501 sends bearer aggregation information response message to eNB 502. At step 515, UE performs RRC reconfiguration procedure to start data aggregation with the selected WLAN on the selected DRB.

In one embodiment, the NAS assisted DRB selection for LWA uses enhance NAS EPS mobility management (EMM) procedures to indicate that either all or none of the established EPS bearers is eligible for LWA. For example, the network entity, such as MME 503, may use the ATTACH ACCEPT and/or TAU ACCEPT messages to notify LWA status to the UE. Subsequently, the UE informs the eNB whether LWA access is allowed using RRC messaging.

In another embodiment, the NAS assisted DRB selection for LWA uses enhance NAS session management (ESM) procedures to indicate that a specific EPS bearer is eligible for LWA. Further, the network, such as MME 503, may also indicate that set of EPS bearers are to be treated in the same manner (i.e. either all members of the set are to be configured for LWA access or none of them are configured for LWA access). The UE may subsequently inform the eNB about which set of DRBs are eligible for LWA access. The UE may also indicate whether a set of DRBs need to be treated similarly.

In yet another embodiment, the DRB selection is preconfigured on the UE. In one embodiment, the operator may use OMA-DM procedures to provide information about IP flows that can be deployed over LWA. Once DRBs are established at the UE, the UE can then determine that DRBs carrying the specified IP flows are eligible for LWA. If a particular DRB carries a combination of IP flows, some of which are eligible for LWA and other(s) are not, then it could be up to operator policy or UE's local setting to determine if the DRB can be used with LWA or not. In any case, the UE can communicate the list of LWA eligible DRBs to the eNB for further action.

Figure 6:
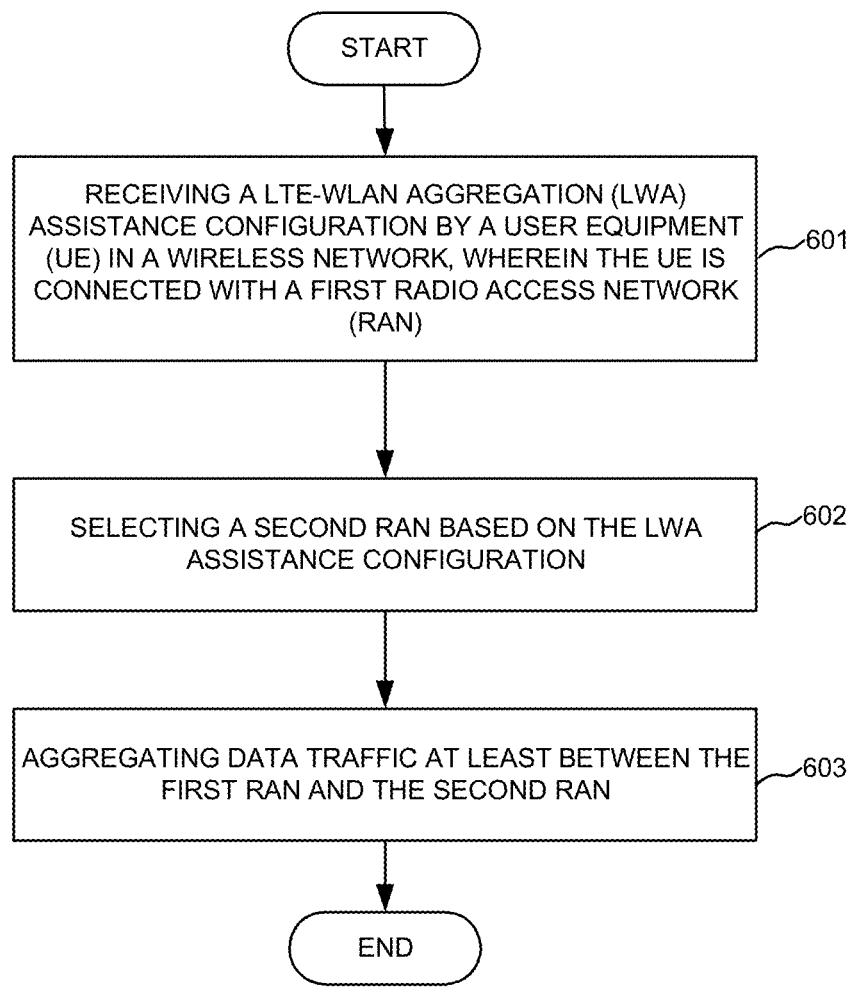
FIG. 6 is an exemplary flow chart of the UE selecting a WLAN AP based on the LWA assistance configuration in accordance with embodiments of the current invention.

FIG. 6 is an exemplary flow chart of the UE selecting a WLAN AP based on the LWA assistance configuration in accordance with embodiments of the current invention. At step 601, the UE receives a LWA assistance configuration in a wireless network, wherein the UE is connected with a first radio access network (RAN). At step 602, the UE selects a second RAN based on the LWA assistance configuration. At step 603, the UE aggregates data traffic at least between the first RAN and the second RAN.

Figure 7:
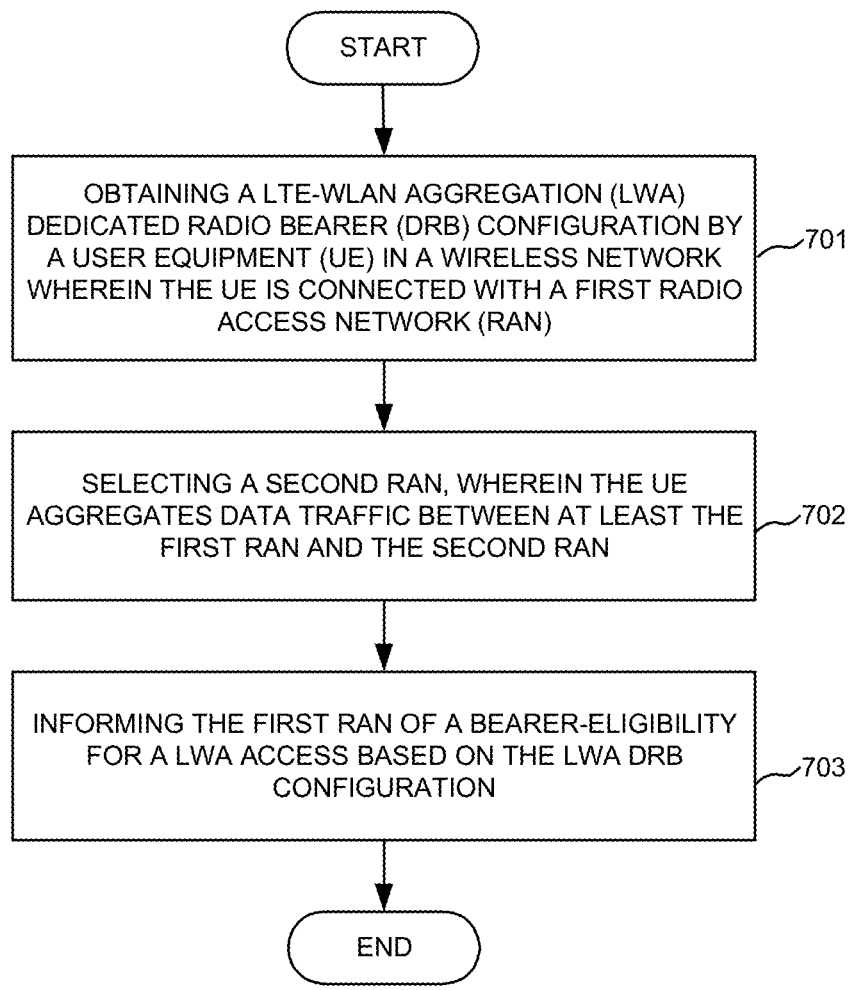
FIG. 7 is an exemplary flow chart of the UE selecting a DRB based on the LWA DRB configuration in accordance with embodiments of the current invention.

FIG. 7 is an exemplary flow chart of the UE selecting a DRB based on the LWA DRB configuration in accordance with embodiments of the current invention. At step 701, the UE obtains a LTE-WLAN aggregation (LWA) dedicated radio bearer (DRB) configuration in a wireless network wherein the UE is connected with a first radio access network (RAN). At step 702, the UE selects a second RAN, wherein the UE aggregates data traffic between at least the first RAN and the second RAN. At step 703, the UE informing the first RAN of a bearer-eligibility for a LWA access based on the LWA DRB configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving an LTE-WLAN aggregation (LWA) assistance configuration by a user equipment (UE) in a wireless network, wherein the UE is connected with a first radio access network (RAN);
selecting, by the UE, a second RAN based on the LWA assistance configuration; and
aggregating data traffic at least between the first RAN and the second RAN, by the UE, wherein the first RAN is LTE, the second RAN is WLAN, and wherein the LWA assistance configuration includes at least one information element comprising: a list of LWA-enabled WLAN access points (APs), a list of LWA-enabled WLAN APs with the type of LWA access supported, a list of prioritized LWA-enabled WLAN APs.

2. The method of claim 1, wherein each of the LWA-enabled WLAN APs is identified by an identification comprising an SSID, a BSSID, and an HESSID.

3. The method of claim 1, wherein the LWA-enabled WALN APs are prioritized based on one or more conditions comprising a backhaul capability, a network status, a WLAN AP load, a version of 802.11 supported, a support capability of IEEE and WFA features.

4. The method of claim 1, wherein the one or more threshold values comprise an WLAN channel utilization, a backhaul rate, a beacon RSSI value, an RSRP value of the first RAN, and an RSRQ value of the first RAN.

5. The method of claim 1, wherein the LWA assistance configuration includes a measurement report configuration, and wherein the UE sends an LWA measurement report based on the LWA assistance configuration.

6. The method of claim 5, wherein the measurement report configuration includes at least one element comprising: a list of base stations of the second RAN to scan, a list of frequencies of the second RAN to scan, and a measurement report triggering scheme.

7. The method of claim 1, further comprising:
receiving an LWA second RAN information request from the first RAN; and
sending an LWA second RAN information response to the first RAN.

8. The method of claim 7, wherein the first RAN is LTE, the second RAN is WLAN, and wherein the LWA second RAN information response includes one or more response information elements comprising: a WLAN association status, an identification of an associated WLAN AP, an IP address of the UE associated with the connected WLAN AP, a summary of a WLAN statistics, and a rejection response indicating no connection attempt to a WLAN AP with one or more optional cause code.

9. The method of claim 1, wherein the first RAN is LTE, the second RAN is WLAN, further comprising:
receiving an LWA WLAN selection request from the first RAN, and wherein the selection request includes one or more selection request elements comprising: a list candidate WLAN APs, a list of prohibited WLAN APs, an association timer value for the association of a WLAN AP, an indication of disabling LWA WLAN access, and a disable timer value indicating a period for LWA WLAN disabling;
selecting a WLAN AP further based on the LWA WLAN selection request; and
sending an LWA WLAN selection response to the first RAN, wherein the selection response includes one or more selectin response elements comprising: a status of a WLAN association attempt, diagnostic information of an association failure, and an indication of rejection of a WLAN association with an optional cause code.

10. A method, comprising:
obtaining, by a user equipment (UE), an LTE-WLAN aggregation (LWA) dedicated radio bearer (DRB) configuration by a user equipment (UE) in a wireless network wherein the UE is connected with a first radio access network (RAN);
selecting, by the UE, a second RAN, wherein the UE aggregates data traffic between at least the first RAN and the second RAN; and
informing, by the UE, the first RAN of a bearer-eligibility for a LWA access based on the LWA DRB configuration, wherein the LWA DRB configuration is obtained through an access stratum (AS) layer of the wireless network.

11. The method of claim 10, wherein the LWA DRB configuration indicates an allowability of all evolved packet system (EPS) bearers, and wherein the UE receives the LWA DRB configuration through a NAS EPS mobility management (EMM) procedure using at least one of NAS messages comprising an ATTACH ACCEPT message, and a TAU ACCEPT message.

12. The method of claim 10, wherein the LWA DRB configuration indicates a LWA eligibility of one or more specific EPS bearers, and wherein the UE receives the LWA DRB configuration through a NAS session management (ESM) procedure.

13. The method of claim 10, wherein the LWA DRB configuration is obtained based on an IP flow configuration configured by at least one of settings comprising: an operator configuration through open mobile alliance (OMA) device management (DM) procedures, and a pre-configuration on the UE.

14. A user equipment (UE) connecting with a first radio access network (RAN) in a wireless communication network, comprising:
a radio frequency (RF) transceiver that transmits and receives radio signals in the wireless communication network;
an LTE-WLAN aggregation (LWA) assistance configurator that configures a LWA assistance configuration;
a selector that selects a second RAN based on the LWA assistance configuration; and
an aggregator that aggregates data traffic at least among the first RAN and the second RAN, wherein the first RAN is LTE, the second RAN is WLAN, and wherein the LWA assistance configuration includes at least one information element comprising: a list of LWA-enabled WLAN access points (Aps), a list of LWA-enabled WLAN Aps with the type of LWA access supported, a list of prioritized LWA-enabled WLAN Aps.

15. The UE of claim 14, wherein the LWA assistance configuration includes a measurement report configuration, and wherein the UE sends an LWA measurement report based on the LWA assistance configuration.

16. The UE of claim 14, further comprising: an LWA dedicated radio bearer (DRB) configurator that obtains an LWA DRB configuration.

17. The UE of claim 16, wherein the LWA DRB configuration is obtained through an access stratum (AS) layer of the wireless network.

18. The UE of claim 16, wherein the LWA DRB configuration indicates an allowability of all evolved packet system (EPS) bearers, and wherein the UE receives the LWA DRB configuration through a NAS EPS mobility management (EMM) procedure using at least one of NAS messages comprising an ATTACH ACCEPT message, and a TAU ACCEPT message.

19. The UE of claim 16, wherein the LWA DRB configuration indicates an LWA eligibility of one or more specific EPS bearers, and wherein the UE receives the LWA DRB configuration through a NAS session management (ESM) procedure.

20. The UE of claim 16, wherein the LWA DRB configuration is obtained based on an IP flow configuration configured by at least one of settings comprising: an operator configuration through open mobile alliance (OMA) device management (DM) procedures, and a pre-configuration on the UE.

* * * * *